Sept. 12, 1939.   F. SCHWARTZKOPF   2,172,715
BUILDER'S DRYING STOVE
Filed June 29, 1937
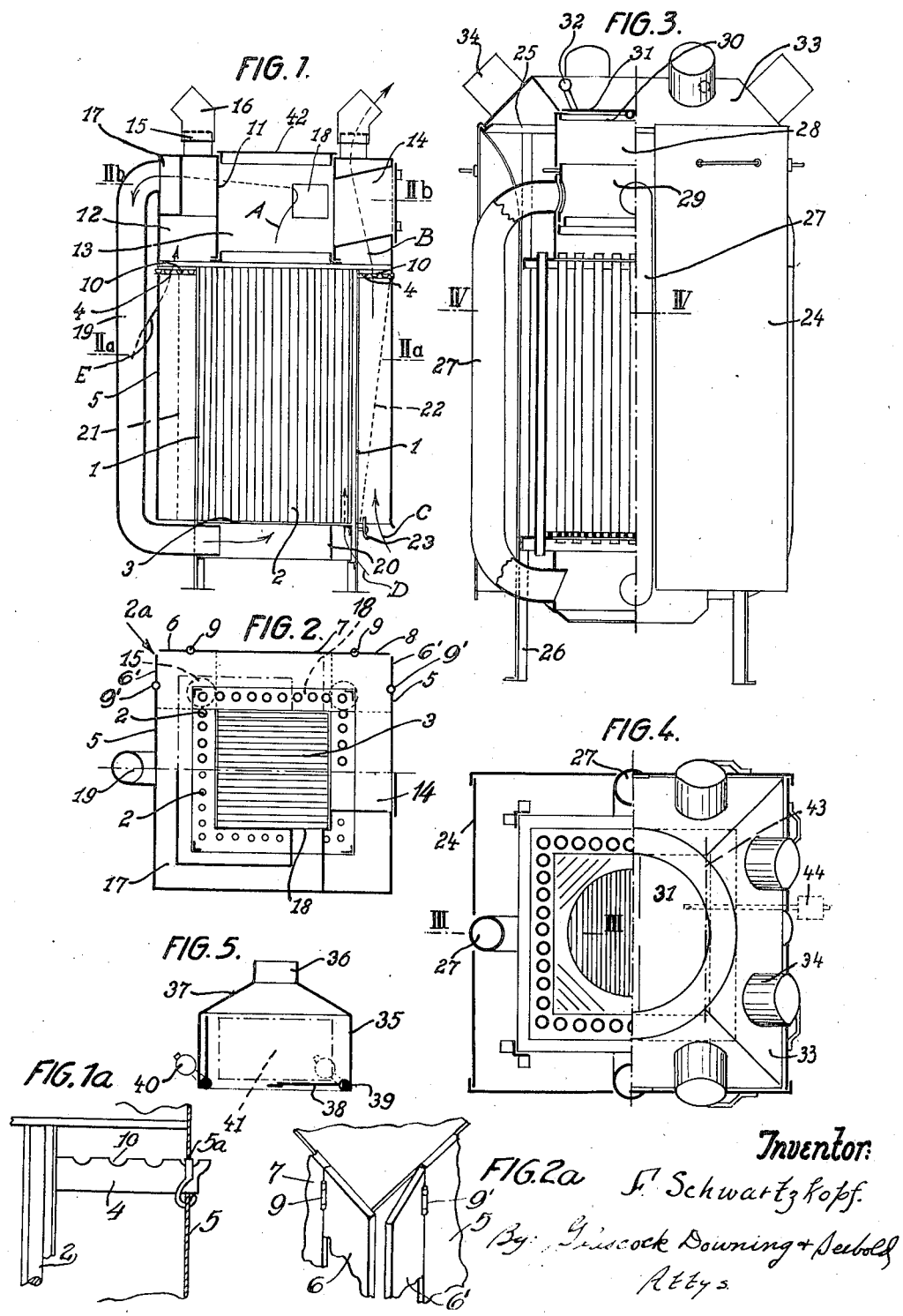

Patented Sept. 12, 1939

2,172,715

UNITED STATES PATENT OFFICE 2,172,715

BUILDER'S DRYING STOVE

Friedrich Schwartzkopf, Berlin, Germany

Application June 29, 1937, Serial No. 151,041
In Germany February 5, 1936

5 Claims. (Cl. 126—79)

This invention relates to a builder's drying stove having a jacket surrounding the coke basket. The known constructions have been mainly based on the idea of effecting a quick drying of a room by supplying heated external air. For this reason it has been the practice for the purpose of supplying external air to connect jacketed stoves directly in a conductive manner with the atmosphere. It has also already been proposed to heat by means of additional heating members the room air which in its circulation is entirely separated from the heating gases. These arrangements, however, exercise only a slight drying effect and in any case only effect the quick drying which is specially desirable in the case of new buildings only to a very limited extent.

It is an object of the invention to provide a more efficient stove of the kind referred to.

To this end, in combination with a coke basket, means are provided for producing carbon dioxide in the bed of coke, and means for admixing the carbon dioxide to the air in the room. In this manner, a very active circulation is effected in the room, and hot air mixed with carbon dioxide flows along the walls. This not only produces rapid evaporation of the moisture in the mortar, and as rapid binding of its constituents. Under the influence of the high temperature, the pores of the mortar are expanded and chemical action is facilitated.

For this purpose the invention makes use of a coke basket, the side walls of which are formed by preferably tubular bars arranged in the manner of a grid, and a jacket is disposed at a certain distance from the sides of the grid, so that the air which flows past between the jacket and the grid and is passed directly into the room is enriched with carbon dioxide flowing from the glowing coke. In order to obtain as great a carbon dioxide development as possible, a closed circuit for the combustion gases is formed. For this purpose the gases ascending in the coke basket are led back to the bed of coke by way of one or more flue downcomers after having been mixed with air in a mixing chamber below the basket. The carbon monoxide contained in the combustion gases is thereby converted into carbon dioxide. The hot combustion gases ascending from the coke bed are cooled to some extent in the downcomers, with a corresponding increase in specific gravity, so that they descend in the downcomers and ascend again in the fuel bed, after having been mixed with air in the mixing chamber. In the fuel bed, they are heated afresh and descend. In this manner, a continuous circulation is established. In order to prevent the gases from cooling down excessively in the flue downcomer, according to a further feature of the invention the flue downcomers are disposed in the space between the side and the jacket. In certain circumstances it may be necessary to lead away the flue gases when heating up the stove. For this purpose, according to another feature of the invention, a casing which is connected to a smoke outlet is placed on a smoke box at the upper end of the stove.

Further essential features of the invention will be gathered from the following description.

In the drawing several constructional examples of the invention are illustrated, Fig. 1 being a vertical central section through a stove according to the invention;

Fig. 1a is a detail of Fig. 1;

Fig. 2, upper half, is a section on the line IIa—IIa in Fig. 1, and Fig. 2, lower half, is a section on the line IIb—IIb in Fig. 1;

Fig. 2a is a detail of Fig. 2, viewed in the direction of the arrows 2a in Fig. 2.

Fig. 3 a side view of a further constructional form, partly in section;

Fig. 4 a plan view of the arrangement according to Fig. 3, partly in section and Fig. 5 a vertical central section of an accessory appliance for a stove according to the invention.

In the drawing 1 is the basket of a coke stove. The basket is formed substantially of vertical or inclined tubular bars 2 which in the constructional example form a space of rectangular cross-section. The bottom of this space is closed by a grate 3 which is preferably constructed as a shaking grate. At the upper part of the stove frame are horizontally disposed, externally projecting angle iron extensions 4. In notches 10 in these extensions jacket members 5 are movably suspended. Fig. 2, upper part, shows that four such jacket members are disposed at a distance from the basket. The jacket members may be divided, as shown for the member at the rear of the stove in Fig. 2. The member comprises a body 7 and a pair of flaps 6 and 8 hinged to the body at 9. Similar flaps 6' can be connected to the members 5 by hinges 9', if desired. The notches 10 serve for enabling the jacket members to be suspended at different distances from the basket.

Above the coke basket is a casing which with the aid of a partition 11 forms an annular chamber 12 which is open at the bottom and extends over the cross-section of the stove, which is formed by the jacket members in their outermost position. The inner chamber 13 which is formed by the partition 11 forms a smoke box or heating gas chamber, to which access may be gained on the one hand through a hopper 14 which is closable from the outside and on the other hand through an upper opening which is adapted to be closed by a cover. The annular chamber 12 is in communication with the atmosphere through connecting branches 15. In the drawing only two such branches are shown, on to which elbow pieces 16 are placed, although according to the constructional example several such connecting branches 15, for instance eight, are intended to be distributed over the chamber.

In the annular chamber 12 there is arranged a heating gas conduit 17 which surrounds the greater part of the stove and which is in communication by way of an opening 18 at either end with the smoke box 13 and opens into a flue downcomer 19, the lower end of which opens into a mixing chamber 20 below the grate 3 for mixing the heating gases with room air flowing in from below through the open lower end of the mixing chamber.

Before further constructional forms are described, the operation of the arrangement according to Fig. 1 and 2 shall first be explained:

The heating gases ascending from the combustion chamber follow the path indicated in Fig. 1 by the arrow A and pass by way of the flue downcomer 19 back under the grate. Unburned constituent parts contained in the heating gases, for instance carbon monoxide, are returned to the combustion process. Owing to the heating of the conduits formed by the jacket members, the air contained in these conduits will flow along the path indicated in Fig. 1 by the arrow B into the room, air from the room at the same time flowing to the conduits in the direction of the arrow C. Through the room air which is in vigorous motion streaming past the glowing coke, the air in the room is enriched with carbon dioxide. The heating of the circulating room air is further enhanced by the heating gas conduit 17 which is heated by the hot gases. The air circulation is further assisted by the current of air flowing through the tubular bars 2 in the direction of the arrow D shown in Fig. 2.

The chamber serves for effectively and uniformly mixing the hot gases and combustion air conveyed to the grate.

The jacket members which are suspended from the sections 4 for instance by means of ordinary ring members 5a can be changed in their position with respect to the grid bars and may be brought for instance into the vertical position 21 indicated in Fig. 1 by broken lines. By this means the amount of room air flowing past the glowing coke is diminished, room air being at the same time and directly admitted to the chamber 12 in the direction of the arrow E shown in Fig. 1 in broken lines. When the jacket members are brought close up to the grid bars, the circulation of air is restricted to the chamber 12. A further throttling of the air circulation can be obtained by bringing the jacket members into the inclined position 22 indicated in broken lines in Fig. 1. For holding the jacket members in this position a socket 23 is provided. Different positions of the individual jacket members may be combined with one another according to requirement, so that through the arrangement adopted a wide range of regulation of the air circulation may be obtained.

The main constructional features of the constructional form according to Figs. 3 and 4 are the same as those in the constructional form according to Figs. 1 and 2. It differs, however, from the constructional form previously described in this, that the four side walls are formed each by two metal sheets 24 which are suspended from the top supporting frame 25. The supporting frame rests on the outwardly-bent ends of the main supports 26. Four flue downcomers 27 are provided, which are distributed symmetrically over the stove, these flue downcomers 27 lying within the spaces formed between the side grids and the enclosure. The smoke box 28 is in this constructional form made cylindrical and provided with a cylindrical slide 29 for enabling the inlet of the flue downcomers 27, which open directly into the smoke box 28, to be altered. The smoke box 28 is covered by a frame 30 which has hinged opening flaps 31 which can be held in the closed or open position by weights 32. The annular space surrounding the smoke box 28 is covered by a cover 33 which is provided with outlet branches 34 for the hot air. In this constructional form the stove is fired through the frame 30 which is capable of being closed by the flaps 31.

In Fig. 5 a cover is shown which consists of a square casing 35 which is covered by a roof 37 which my means of a branch 36 can be connected to a chimney. The bottom opening of the casing 35 is closable by flaps 38 which are pivoted at 39. The outwardly projecting pivot pin ends carry arms provided with weights 40, which secure the flaps in their open and closed positions. In one of the side walls a firing door 41 is provided, which is indicated in Fig. 5 in dot and dash lines. This cover is of such a size that it can be placed instead of the lid 42 on the smoke box 13 of the stove shown in Fig. 1.

When the stove is to be started up, the flaps 38 are open and are only closed again, as soon as the heating-up operation is ended. The cover can then be removed and replaced by the lid 42. For stoves with a cylindrical smoke box, for instance as in the constructional form shown in Fig. 3, cylindrical covers of suitable size are used. The constructional form according to Figs. 3 and 4 can also be made with a square smoke box, as is shown in Fig. 4 by broken lines. The flaps 31 will then pivot about pivot pins 43 and may be provided with weights 44 which in the open position occupy the position shown by broken lines in Fig. 4.

I claim:

1. In a builder's drying stove adapted to be placed in a room for drying, vertical grate bars forming a coke basket, a smoke box arranged above the basket in open communication with the space between its bars, a chamber surrounding the smoke box and defining a duct connecting it to the ambient air, a jacket which surrounds the coke basket in spaced relation and is connected to the chamber at its upper, and to the ambient air at its lower end, a mixing chamber below the basket which is open to the ambient air at its lower, and to the coke basket at its upper end, and a downtake connecting the smoke box to the mixing chamber.

2. In a builder's drying stove adapted to be placed in a room for drying, vertical grate bars forming a coke basket, a smoke box arranged above the basket in open communication with the space between its bars, a chamber surrounding the smoke box and defining a duct connecting it to the ambient air, a jacket which surrounds the coke basket in spaced relation and is connected to the chamber at its upper, and to the ambient air at its lower end, a mixing chamber below the basket which is open to the ambient air at its lower, and to the coke basket at its upper end, and a downtake extending partly through the chamber and connecting the smoke box to the mixing chamber.

3. In a builder's drying stove adapted to be placed in a room for drying, vertical grate bars forming a coke basket, a smoke box arranged above the basket in open communication with the space between its bars, a detachable chimney arranged to be placed on the smoke box, a fire door in the chimney, means for varying the free sectional area of the chimney, a chamber surrounding the smoke box and defining a duct connecting it to the ambient air, a jacket which surrounds the coke basket in spaced relation and is connected to the chamber at its upper, and to the ambient air at its lower end, a mixing chamber below the basket which is open to the ambient air at its lower, and to the coke basket at its upper end, and a downtake connecting the smoke box to the mixing chamber.

4. In a builder's drying stove adapted to be placed in a room for drying, vertical grate bars forming a coke basket, a smoke box arranged above the basket in open communication with the space between its bars, a chamber surrounding the smoke box and defining a duct connecting it to the ambient air, a plurality of plates arranged to make up a jacket which surrounds the coke basket in spaced relation and is connected to the chamber at its upper, and to the ambient air at its lower end, means for adjusting the plates of the jacket so as to vary the free sectional area of the space defined by the plates and the basket, a mixing chamber below the basket which is open to the ambient air at its lower, and to the coke basket at its upper end, and a downtake connecting the smoke box to the mixing chamber.

5. In a builder's drying stove adapted to be placed in a room for drying, vertical grate bars forming a coke basket, a smoke box arranged above the basket in open communicaton with the space between its bars, a chamber surrounding the smoke box and defining a duct connecting it to the ambient air, a plurality of plates arranged to make up a jacket which surrounds the coke basket in spaced relation and is connected to the chamber at its upper, and to the ambient air at its lower end, the plates being arranged in spaced relation to each other, a flap hinged to at least one of the plates for bridging the gap between this and the adjacent plate, means for adjusting the plates so as to vary the free sectional area of the space defined by the plates and the basket, a mixing chamber below the basket which is open to the ambient air at its lower, and to the coke basket at its upper end, and a downtake connecting the smoke box to the mixing chamber.

FRIEDRICH SCHWARTZKOPF.